United States Patent [19]

Fujiki et al.

[11] Patent Number: 5,530,060
[45] Date of Patent: Jun. 25, 1996

[54] SILICONE COMPOSITION CAPABLE OF YEILDING A CURED PRODUCT HAVING GOOD THERMAL CONDUCTIVITY

[75] Inventors: Hironao Fujiki, Takasaki; Masayuki Ikeno, Annaka, both of Japan

[73] Assignee: Shin-Etsu Chemical Co., Ltd., Tokyo, Japan

[21] Appl. No.: 410,641

[22] Filed: Mar. 21, 1995

Related U.S. Application Data

[63] Continuation of Ser. No. 892,887, Jun. 3, 1992, abandoned.

[30] Foreign Application Priority Data

Jun. 3, 1991 [JP] Japan ................................ 3-159977

[51] Int. Cl.$^6$ .............................. C08K 3/10; C08L 83/04
[52] U.S. Cl. ........................................ 524/786; 524/862
[58] Field of Search ................................. 524/786, 862

[56] References Cited

U.S. PATENT DOCUMENTS

| | | | |
|---|---|---|---|
| 3,844,992 | 10/1974 | Antonen | 524/862 |
| 4,072,635 | 2/1978 | Jeram | 524/862 |
| 4,801,642 | 1/1989 | Janik et al. | 525/478 |
| 5,008,307 | 4/1991 | Inomata | 523/220 |
| 5,023,291 | 6/1991 | Sakamoto et al. | 524/786 |

FOREIGN PATENT DOCUMENTS 587452  1/1983  Japan .

*Primary Examiner*—John C. Bleutge
*Assistant Examiner*—Karen A. Dean
*Attorney, Agent, or Firm*—Lowe, Price, LeBlanc & Becker

[57] ABSTRACT

A silicone composition is of the addition reaction type which comprises a vinyl group-containing organopolysiloxane, an organohydrogenpolysiloxane which has at least one hydrogen atom joined to a silicon atom in one molecule, a platinum group metal catalyst, and an aluminum oxide powder which is substantially round or spherical in shape with an average particle size of not larger than 50 μm and wherein when the aluminum oxide powder is subjected to extraction of alkali metal ions and halogen ions under conditions of 121° C., 2 atmospheric pressures, 100% R.H. and 20 hours, the contents of both ions are, respectively, not larger than 5 ppm. The cured product obtained from the composition has high thermal conductivity and the composition is useful as a sealant of electric and electronic parts and can prevent the parts from being corroded.

13 Claims, No Drawings

SILICONE COMPOSITION CAPABLE OF YEILDING A CURED PRODUCT HAVING GOOD THERMAL CONDUCTIVITY

This application is a continuation of application Ser. No. 07/892,887, filed Jun. 3, 1992, now abandoned.

BACKGROUND OF THE INVENTION

1. Field of the Invention

This invention relates to a silicone composition which is capable of yielding a cured product having good thermal conductivity and is thus useful as a protective sealing material for electric and electronic parts such as IC.

2. Description of the Prior Art

Silicone compositions of the addition curing type which are composed of vinyl group-containing organopolysiloxanes and organohydrogenpolysiloxanes having hydrogen atoms joined to the silicon atoms are able to form a cured product of a gel-like elastomer or a so-called silicone gel. This type of silicone composition has wide utility in the field of protective sealants for electric and electronic parts such as integrated circuits.

However, the known silicone composition is so small in thermal conductivity that when it is used for sealing of electric elements of a large capacitance, the heat generated from the element cannot be dissipated to a satisfactory extent. This eventually leads to the problem that the influence of the heat on a solder or the element cannot be suppressed as desired.

It is known that in order to improve the thermal conductivity of the silicone gel, use of fillers with good thermal conductivity is effective. Such fillers include, for example, silica powder, aluminium oxide powder, silicon carbide powder, silicon nitride powder, aluminium nitride powder, magnesium oxide powder, diamond powder, powders of metals such as iron, stainless steels, copper and the like and carbon powder.

Of these fillers, the metallic powders and carbon powder are electrically conductive and cannot be used in the IC-sealing silicone compositions which have to be electrically insulating in nature.

Although the silicon nitride, aluminium nitride and magnesium nitride powders may be used from the standpoint of electric insulation, all of them are hydrolyzable, with the attendant problem that they are short of long-term stability. These powders may be coated on the surfaces thereof with non-hydrolyzable materials so as to avoid the above problem. However, such a coating is not good in economy.

The silicon carbide and diamond powders have so high a hardness that it is not convenient to use them because of wear or break down of wirings of elements by means of the exposed edges of the powder. In addition, the diamond powder is too expensive.

In view of the above, fillers which are usable in practical applications include silica and aluminium oxide powders. However, the silica powder is not satisfactory with respect to the thermal conductivity. In order to impart high thermal conductivity to the silicone composition by the use of the silica powder, workability will be greatly impeded in view of the increase in viscosity of the resultant silicone composition. With aluminium oxide powder, a vital disadvantage is produced in that elements to be protected undergo corrosion.

SUMMARY OF THE INVENTION

It is accordingly an object of the invention to provide a silicone composition which overcomes the problems of the prior art and which is able to yield a cured product having good thermal conductivity and is thus suitable for use as a sealant for electric and electronic parts.

It is another object of the invention to provide a silicone composition which is able to yield a silicone gel product having good heat dissipating properties and which does not substantially cause corrosion of electric and electronic parts.

The above objects can be achieved, according to the invention, by a silicone composition which comprises, in combination:

(A) an organopolysiloxane consisting essentially of 80 to 97 mole % of $R(CH_3)SiO$ units, from 1.0 to 10.0 mole % of $RSiO_{1.5}$ units, from 0.1 to 4.0 mole % of $CH_3(C_6H_5)(CH_2=CH)SiO_{0.5}$ units and 1 to 10 mole % of $R(CH_3)_2SiO_{0.5}$ units wherein R's in the respective units independently represent a methyl group, a phenyl group or $RfCH_2CH_2$— wherein Rf represents a perfluoroalkyl group or a perfluoroether group;

(B) an organohydrogenpolysiloxane which has at least one hydrogen atom joined to a silicon atom in one molecule;

(C) a platinum group metal catalyst; and (D) an aluminum oxide powder which has substantially a round or spherical shape with an average particle size of not larger than 50 μm and wherein when the aluminum oxide powder is subjected to extraction of alkali metal ions and halogen ions under conditions of 121° C., 2 atmospheric pressures, 100% R.H. and 20 hours, the contents of both ions are, respectively, not larger than 5 ppm.

DETAILED DESCRIPTION AND EMBODIMENTS OF THE INVENTION

The respective ingredients which are essential in the composition of the invention are described.

The ingredient (A) is a vinyl group-containing organopolysiloxane which is used as a base polymer of the composition. The organopolysiloxane should consist essentially of the following units

| | |
|---|---|
| $R(CH_3)SiO$ units | 80 to 97 mole % |
| $RSiO_{1.5}$ units | 1.0 to 10.0 mole % |
| $CH_3(C_6H_5)(CH_2=CH)SiO_{0.5}$ units | 0.1 to 4.0 mole % |
| $R(CH_3)_2SiO_{0.5}$ units | 1,0 to 10.0 mole % | wherein R's in the respective units represent a methyl group, a phenyl group or $RfCH_2CH_2$— wherein Rf represents a perfluoroalkyl group or a perfluoroether group.

In the constituent units, if R represents $RfCH_2CH_2$— wherein Rf is a perfluoroalkyl group, the perfluoroalkyl group should preferably contain no more than 12 carbon atoms, including, for example, $CF_3CH_2$—, $C_4F_9CH_2CH_2$—, or $C_8F_{17}CH_2CH_2$—. On the other hand, examples of the perfluoroether group include the groups of the following formulas:

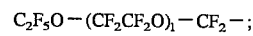

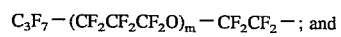

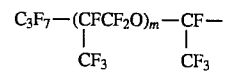

wherein l is an integer of from 0 to 3, and m in the respective units is an integer of from 0 to 2.

It is important that the organopolysiloxane have the $CH_3(C_6H_5)(CH_2=CH)SiO_{0.5}$ units which serve as curing reaction units or a crosslinking group. In general, organopolysiloxanes having $CH_3SiO_{0.5}$ units have good low temperature characteristics. For instance, Japanese Laid-open Patent Application No. 58-7452 teaches an organopolysiloxane which comprises:

| | |
|---|---|
| $(CH_3)_2SiO$ units | 80 to 96.5 mole % |
| $CH_3SiO_{1.5}$ units | 2.0 to 10.0 mole % |
| $(CH_3)_2(CH_2=CH)SiO_{0.5}$ units | 0.25 to 4.0 mole % |
| $(CH_3)_3SiO_{0.5}$ units | 1.25 to 6.0 mole % |

According to this application, In order to cause the curing reaction to proceed quickly, it is essential that the organopolysiloxane contain the $(CH_3)_2(CH_2=CH)SiO_{0.5}$ units as curing reaction units.

According to the invention, the organopolysiloxane having the $CH_3(C_6H_5)(CH_2=CH)SiO_{0.5}$ units as curing reaction units is used as a base polymer. By this, it is possible to improve low temperature characteristics while keeping a given curing velocity. In addition, the silicone composition comprising the above units has a satisfactory pot life or good storage stability.

The vinyl group-containing organopolysiloxane can be prepared by a method known per se and is prepared, for example, by equilibrating a co-hydrolyzate or a siloxane composition of chlorosiloxanes capable of yielding corresponding units at molar ratios defined hereinabove.

The vinyl group-containing organopolysiloxane should preferably have a viscosity from 300 to 3,000 cps., at 25° C. As a matter of course, other types of organopolysiloxanes may be used in amounts not impeding inherent properties of the silicone composition of the invention.

The ingredient (B) is an organohydrogenpolysiloxane which should have at least one hydrogen atom joined to the silicon atom or at least one SiH group in one molecule. This ingredient serves as a crosslinking agent. More particularly, the vinyl groups of the curing reaction units in the ingredient (A) and the SiH groups are addition reacted to form a silicone gel or cured product.

This organohydrogenpolysiloxane is not critical with respect to the molecular structure provided that such a hydrogen atom joined to the silicon atom is contained in the molecule and may have, for example, a linear, cyclic or branched structure. The silicon atom to which the hydrogen atom is joined generally has substituents which may be a substituted or unsubstituted monovalent hydrocarbon group free of any aliphatic unsaturated bond. Examples of such hydrocarbon groups include: an alkyl group having from 1 to 11 carbon atoms such as a methyl group, an ethyl group, a propyl group, a butyl group, a pentyl group, a hexyl group, an octyl group, a decyl group or a dodecyl group; a cycloalkyl group having from 4 to 8 carbon atoms such as a cyclopentyl group, a cyclohexyl group, a cyclobutyl group or the like; an aryl group such as a phenyl group, a tolyl group, a xylyl group, a naphthyl group or the like; an aralkyl group such as a benzyl group, a phenylethyl group, a phenylpropyl group or the like; and the above-mentioned hydrocarbon groups whose hydrogen atoms are partially or fully substituted with a halogen atom such as chlorine, fluorine, bromine or iodine, a cyano group or the like, e.g. a chloromethyl group, a trifluoropropyl group, a chlorophenyl group, a dibromophenyl group, a tetrachlorophenyl group, a difluorophenyl group, halogenated hydrocarbon groups of the formula, $RfCH_2CH_2—$ group wherein Rf has the same meaning as defined with respect to the vinyl group-containing organopolysiloxane of the ingredient (A), and cyanoalkyl groups such as a β-cyanoethyl group, a γ-cyanopropyl group, a β-cyanopropyl group or the like. Of these, a methyl group, a phenyl group or the $RfCH_2CH_2—$ group is preferred, Although not limitative, specific examples of the organohydrogenpolysiloxane include those of the following formulas (1) to (8)

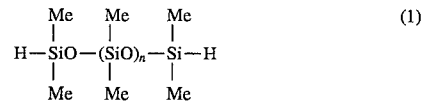

wherein Me represents a methyl group and n is an integer of from 1 to 80;

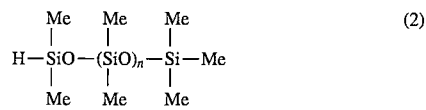

wherein Me and n have, respectively, the same meanings as defined above;

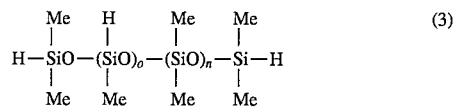

wherein Me and n have, respectively, the same meanings as defined above and o is an integer of from 1 to 40;

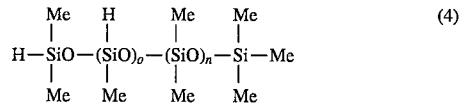

wherein Me, n and o have, respectively, the same meanings as defined above;

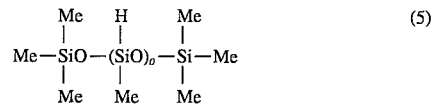

wherein Me and o have, respectively, the same meanings as defined above;

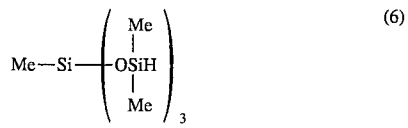

and

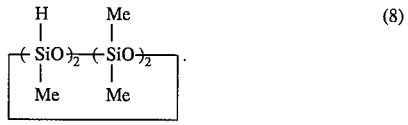

The organohydrogenpolysiloxane should preferably have a viscosity of from 1 to 1000 cps., at 25° C.

The organohydrogenpolysiloxane is known and can be prepared according to a method known per se.

In the practice of the invention, the organohydrogenpolysiloxanes may be used singly or in combination. Preferably, the organohydrogenpolysiloxane is used in such an amount that the hydrogen atom joined to the silicon atom is contained at a rate of from 0.5 to 1.5 in number, preferably from 0.8 to 1.2 in number, per unit number of the vinyl group of the ingredient (A). If the number of the hydrogen atom is smaller than 0.5, the crosslinkage density becomes too low, thus leading to the tendency that the heat resistance of the silicone gel obtained from the resultant composition is lowered. On the other hand, when the number of the hydrogen atom is larger than 1.5, there may arise a problem of foaming owing to the dehydrogenation reaction or the tendency that the heat resistance is lowered.

The ingredient (C) is a platinum group metal catalyst which promotes the addition reaction between the vinyl group of the ingredient (A) and the hydrosilyl group ($\equiv$SiH group) of the ingredient (B). Examples of the catalyst include chloroplatinic acid, alcohol-modified chloroplatinic acid, coordination compounds of chloroplatinic acid and olefins, aldehydes, vinyl siloxane or acetylene compounds, tetrakis(triphenylphosphin) palladium, chlorotris(triphenylphosphin) rhodium and the like. Of these, the platinum-based catalysts are preferred. More preferably, a coordination compound of chloroplatinic acid and vinyl siloxane is used.

In the practice of the invention, the amount of the platinum group metal catalyst may be determined depending on an intended curing rate. Preferably, the catalyst is used in the range of from 0.1 to 500 ppm, more preferably from 1 to 200 ppm, calculated as a platinum group metal, based on the ingredient (A). If the resultant silicone gel is required as having light permeability, the amount of the catalyst is preferably in the range of from 1 to 50 ppm.

The ingredient (D) is an aluminum oxide powder used as a filler, which is added in order to improve the thermal conductivity of the silicone gel. It is important that the aluminum oxide powder be substantially round or spherical in shape and have an average size of not larger than 50 μm and that when the contents of alkali metal ions and halogen ions extracted from the powder under conditions of 121° C., two atmospheric pressures, 100% R.H. and 20 hours are, respectively, not larger than 5 ppm. The term "substantially round or spherical in shape" is intended to mean an elongation ranging from 1.0 to 1.4.

As stated hereinbefore, it is known in the art that aluminum oxide powder is formulated as the filler in the organopolysiloxane composition. The prior art compositions have the defect that they cause electric or electronic elements or devices to undergo corrosion or abrasive defects, making it difficult to apply them to precision electronic appliances as a sealant.

According to the invention, since aluminum oxide fine powder which is substantially spherical in shape and is thus free of sharp edges is used, abrasive defects of the element as will occur during the thermal expansion or shrinkage accompanied by the curing of the silicone composition can be effectively avoided. In addition, the aluminum oxide fine powder used in the present invention is suppressed to a very low level with respect to the contents of both alkali metal and halogen ions, so that corrosion of the elements to be protected can also be effectively avoided. Aluminum oxide powder which has been ordinarily used in the prior art contain large amounts of impurities such as alkali metal ions and halogen ions. When moisture is passed through or into the silicon gel having a large vapor permeability, the alkali metal ions or halogen ions are dissolved in the moisture and directly contact the element to be protected. This is considered for the reason why corrosion takes place.

The contents of the alkali metal ions and the halogen ions may be measured, for example, by flame photometry or ion chromatography. The aluminum oxide powder wherein these ion contents are suppressed to a minimum can be prepared, for example, by a procedure wherein metallic aluminum powder is fused and oxidized by blowing oxygen gas. This type of aluminum oxide powder is commercially available, for example, under the designations of High Purity Alumina AS-20, AS-30 and AS-40 of Showa Denko Co., Ltd.

In the practice of the invention, the aluminum oxide powder is preferably used in an amount of from 25 to 90 wt %, more preferably from 60 to 80 wt %., based on the silicone composition. If the amount is less than 25 wt %, the thermal conductivity becomes low with unsatisfactory heat dissipating properties. In addition, the degree of thermal expansion or shrinkage at the time of curing becomes great, with the tendency that physical damages will be made on elements to be protected. When the amount exceeds 90 wt %, the fluidity of the silicone composition lowers and problems may be produced on workability or pouring into electric or electronic parts.

In the practice of the invention, the silicone composition of the invention may comprise, aside from the ingredients (A) to (D), various known additives in amounts not impeding the silicone composition.

For instance, additives for controlling the curing rate and storage stability are used for this purpose. Examples include vinyl group-containing organopolysiloxane such as methyl vinyl cyclotetrasiloxane, triallyl isocyanurate, alkyl maleates, acetylene alcohol and modified products thereof with silanes or siloxanes, hydroperoxides, tetramethylethylenediamine, benzotriazole and the like. These may be used singly or in combination. These additives may be used each in an amount of ranging from 0.01 to 100,000 ppm based on the silicone composition.

The silicone composition of the invention is readily prepared by uniformly mixing the essential ingredients at predetermined ratios.

The composition is generally cured by heating at a temperature of from 40° to 180° C. for 10 to 60 minutes. The resultant product or silicone gel has a penetration of 20 to 100 when determined by the method prescribed in ASTM 1403 (using a ¼ cone).

The silicone gel has high thermal conductivity with good heat dissipating properties and keeps an effective elasticity even at a very low temperature of –60° C.

The silicone composition can be effectively employed as a sealant for electric or electronic parts or elements.

The invention is more particularly described by way of examples. In the examples, the viscosity is a measurement determined at 25° C.

EXAMPLE 1

Vinyl group-containing organopolysiloxane ($Me_2SiO$ units 94.24 mole %, vinyl/methyl/phenyl$SiO_{0.5}$ units 0.52 mole %, and $MeSiO_{3/2}$ units 3 mole %, viscosity 1500 cps.) 71 parts by weight Dimethylpolysiloxane ($Me_2SiO$ units 94 mole %, $Me_3SiO_{1/2}$ units 3 mole %, $MeSiO_{3/2}$ units 3 mole %, viscosity 500 cps.) 29 parts by weight Aluminum oxide (1) indicated in Table 350 parts by weight The composition of the above formulation was mixed at 150° C. for 1 hour. The mixture was cooled down to normal temperatures, to which 0.08 parts by weight of ethynyl cyclohexanol was uniformly added. Thereafter, 0.06 parts by weight of a vinyl siloxane complex of chloroplatinic acid (having 1 wt % of Pt) was uniformly added to the mixture, followed by uniform mixing of the following ingredients in amounts indicated below, thereby obtaining a curable organopolysiloxane composition.

Methylhydrogensiloxane A (Me$_2$HSiO$_{1/2}$ 10 mole % and Me$_2$SiO units 90 mole %, viscosity 18 cps.) 4.3 parts by weight Methylhydrogensiloxane B (Me$_2$HSiO$_{1/2}$ 2.5 mole %, Me$_3$SiO$_{1/2}$units 2.5 mole % and Me$_2$SiO units 95 mole %, viscosity 35 cps.) 6.7 parts by weight The composition was heated under conditions of 150° C. and 30 minutes to obtain a cured product. The product was subjected to measurements of the thermal conductivity, corrosion property and penetration (ASTM D-1403). The results are shown in Table.

The corrosion property was evaluated according to the following procedure.

An open conductive wire with a diameter of 0.1 mm was wound around a teflon sheet (fluorocarbon resin sheet) on which the silicone composition was applied and cured. The thus obtained test piece was placed in a test vessel under conditions of a temperature of 120° C. and a humidity of 85%, followed by applying a potential of DC 100 volts for 500 hours, after which traces of corrosion were checked. The mark "o" indicates a test piece completely free of any corrosion traces and the mark "x" indicates a test piece having corrosion traces.

EXAMPLE 2

The general procedure of Example 1 was repeated except that there was used a vinyl group-containing organopolysiloxane consisting of 94.24 mole % of Me$_2$SiO units, 0.52 mole % of (vinyl)(Me)(phenyl)SiO$_{1/2}$ units, 2.24 mole % of Me$_3$SiO$_{1/2}$ units and 3.00 mole % of (phenyl) SiO$_{3/2}$ units and having a viscosity of 1400 cps., and aluminum oxide used was No. 2 of the table, thereby obtaining a silicone composition. The composition was cured and subjected to measurements of the characteristics of the resultant cured product.

The results are shown in the table.

Comparative Example 1

The general procedure of Example 1 was repeated except that aluminum oxide used was No.3 of the table, thereby obtaining a silicone composition. The composition was cured and subjected to measurements of the characteristics of the resultant cured product. The results are shown in the table.

Comparative Example 2

The general procedure of Example 1 was repeated except that aluminum oxide used was No.4 of the table, thereby obtaining a silicone composition. The composition was cured and subjected to measurements of the characteristics of the resultant cured product. The results are shown in the table.

EXAMPLE 3

The general procedure of Example 1 was repeated except that 0.0006 parts by weight of tetramethylethylenediamine was used instead of ethynyl cyclohexanol, thereby obtaining a silicone composition. The composition could be stably stored at a temperature of 40° C. for about one month. The composition was heated under conditions of 150° C. and 30 minutes and cured to obtain a gel product having a penetration of 55.

Comparative Example 3

The general procedure of Example 3 was repeated except that there was used a vinyl group-containing organopolysiloxane consisting of 94.24 mole % of Me$_2$SiO units, 0.52 mole % of (vinyl) (Me)$_2$SiO$_{1/2}$ units, 2.24 mole % of Me$_3$SiO$_{1/2}$ units and 3.00 mole % of MeSiO$_{3/2}$ units and having a viscosity of 1600 cps., thereby obtaining a silicone composition. The storage stability of the composition at 40° C. was about one day.

The composition was heated and cured under conditions of 150° C. and 30 minutes to obtain a gel product with a penetration of 53.

Table

|  | Example 1 | Example 2 | Comp.Ex.1 | Comp.Ex.2 |
| --- | --- | --- | --- | --- |
| Aluminum oxide: | 1 | 2 | 3 | 4 |
| average size (μm) | 15 | 10 | 50 | 12 |
| elongation | 1.1 | 1.1 | 1.6 | 1.5 |
| Cl ion content (ppm) | 3 | 1 | 30 | 5 |
| Na ion content (ppm) | 1 | 1 | 200 | 20 |
| Characteristic Properties: |  |  |  |  |
| thermal conductivity (Cal/cm · second. °C.) | 30 × 10$^{-4}$ | 30 × 10$^{-4}$ | 20 × 10$^{-4}$ | 25 × 10$^{-4}$ |
| corrosion property (PCT) | o | o | x | x |
| penetration | 60 | 55 | 60 | 55 |

What is claimed is:

1. A silicone composition which consists essentially of:

(A) an organopolysiloxane consisting essentially of 80 to 97 mole % of R(CH$_3$)SiO units, from 1.0 to 10.0 mole % of RSiO$_{1.5}$ units, from 0.1 to 4.0 mole % of CH$_3$(C$_6$H$_5$)(CH$_2$=CH)SiO$_{0.5}$ units and 1 to 10 mole % of R(CH$_3$)$_2$SiO$_{0.5}$ units wherein R's in the respective units independently represent a methyl group, a phenyl group or RfCH$_2$CH$_2$— wherein Rf represents a perfluoroalkyl group or perfluoroether group;

(B) an organohydrogenpolysiloxane which has at least one hydrogen atom joined to a silicon atom in one molecule, the organohydrogenpolysiloxane being used in an amount such that the hydrogen atom joined to the silicon atom is present at a rate of 0.5 to 1.5 in number per unit number of the vinyl group of ingredient (A);

(C) a platinum group metal catalyst; and (D) an aluminum oxide powder which is substantially spherical in shape with an average particle size of not larger than 50 μm and wherein when the aluminum oxide powder is subject to extraction of alkali metal ions and halogen ions under conditions of 121° C., two atmospheric pressures, 100 % R.H. and 20 hours, the contents of both ions are, respectively, not larger than 5 ppm, wherein when said silicone composition is cured, the resultant gel has a penetration value of 20 to 100 as measured by the method prescribed in ASTM 1403 using a ¼ cone.

2. The silicone composition according to claim 1, wherein said vinyl group-containing organopolysiloxane has a viscosity of from300 to 3000 cps., at 25° C.

3. The silicone composition according to claim 1, wherein said organohydrogenpolysiloxane has silicon atoms to which a hydrogen atom is joined and which are substituted with hydrogen groups.

4. The silicone composition according to claim 3, wherein said substituted or unsubstituted monovalent hydrocarbon is a methyl group, a phenyl group or a RfCH$_2$CH$_2$—group wherein Rf represents a perfluoroalkyl group or a perfluoroether group.

5. The silicone composition according to claim 1, wherein said organohydrogenpolysiloxane is contained in such an amount that the number of the hydrogen atoms joined to the silicon atom is in the range of 0.5 to 1.5 per unit number of the vinyl group contained in ingredient (A).

6. The silicone composition according to claim 1, wherein said platinum group metal catalyst is used in an amount of from 0.1 to 500 ppm based on ingredient (A).

7. The silicone composition according to claim 1, wherein said platinum group metal catalyst is used in an amount of from 1 to 50 ppm whereby a silicone gel obtained curing the composition is permeable to light.

8. The silicone composition according to claim 1, wherein said platinum group metal catalyst is a coordination compound of chloroplatinic acid and vinyl siloxane.

9. The silicone composition according to claim 1, wherein said aluminum oxide powder has a spherical form having an elongation of from 1.0 to 1.4.

10. The silicone composition according to claim 1, wherein said aluminum oxide powder is used in an amount of from 25 to 90 wt % based on the silicone composition.

11. The silicone composition according to claim 1, wherein said composition is heated at a temperature of from 40° to 180° C. for a time sufficient to cure the composition, thereby obtaining a cured product.

12. A cured product obtained from the silicone composition of claim 1.

13. The silicone composition as set forth in claim 1, wherein the organohydrogenpolysiloxane is used in amount such that the hydrogen atom joined to the silicon atom is present at a rate of 0.8 to 1.2 in number per unit of the vinyl group of the ingredient (A).

* * * * *